(12) United States Patent
Li et al.

(10) Patent No.: US 11,890,922 B2
(45) Date of Patent: Feb. 6, 2024

(54) ROOF ASSEMBLY FOR A VEHICLE, AND VEHICLE COMPRISING SUCH ROOF ASSEMBLY

(71) Applicant: Inalfa Roof Systems Group B.V., Oostrum (NL)

(72) Inventors: Robert Li, Shanghai (CN); Laura Leng, Shanghai (CN)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 5 days.

(21) Appl. No.: 17/560,853

(22) Filed: Dec. 23, 2021

(65) Prior Publication Data

US 2022/0203812 A1 Jun. 30, 2022

(30) Foreign Application Priority Data

Dec. 30, 2020 (CN) .......................... 202011601311.5

(51) Int. Cl.
  *B60J 7/16* (2006.01)
(52) U.S. Cl.
  CPC ........... *B60J 7/1657* (2013.01); *B60J 7/1642* (2013.01)
(58) Field of Classification Search
  CPC ....... B62D 25/06; B60J 7/1657; B60J 7/1642; B60J 10/82; B60J 10/18
  USPC ..... 296/216.03, 216.01, 221, 216.06, 216.09
  See application file for complete search history.

(56) References Cited

U.S. PATENT DOCUMENTS

| 6,378,935 | B2 * | 4/2002 | Dryselius | B60J 7/0084 |
| | | | | 296/213 |
| 7,441,833 | B1 * | 10/2008 | Pomeroy | B60J 7/022 |
| | | | | 296/214 |
| 11,479,100 | B2 * | 10/2022 | van Boxtel | B60J 10/30 |
| 2001/0028181 | A1 * | 10/2001 | Pfalzgraf | B60J 7/047 |
| | | | | 296/221 |
| 2001/0054833 | A1 * | 12/2001 | Wingen | B60J 7/0015 |
| | | | | 296/214 |

(Continued)

FOREIGN PATENT DOCUMENTS

| DE | 20103626 B3 | 4/2002 |
| DE | 102017003968 U1 | 5/2018 |

(Continued)

OTHER PUBLICATIONS

European Search Report in corresponding European application No. 21216967.6 dated Sep. 1, 2022.

*Primary Examiner* — Amy R Weisberg
*Assistant Examiner* — Wenwei Zhuo
(74) *Attorney, Agent, or Firm* — Steven M. Koehler; Westman, Champlin & Koehler, P.A.

(57) ABSTRACT

A roof assembly for attachment to reinforcement beams in a fixed roof of a vehicle comprises a frame surrounding at least a part of an opening and configured to be attached to at least the reinforcement beams of the vehicle. The frame is made primarily of plastic material. At least a first stationary panel is at least partly semi-transparent and is at least partly fixed to the frame. At least one movable panel is arranged adjacent the stationary panel. A reinforcement is integrated in the frame. The reinforcement extends at least around an area covered by the movable panel, and along at least a portion of the frame configured to be attached to the reinforcement beams of the vehicle.

19 Claims, 16 Drawing Sheets

(56) References Cited

U.S. PATENT DOCUMENTS

| | | | |
|---|---|---|---|
| 2002/0113464 A1* | 8/2002 | Wieschermann | B62D 65/00 |
| | | | 296/210 |
| 2006/0055212 A1 | 3/2006 | Schonebeck | |
| 2007/0069552 A1* | 3/2007 | Schumacher | B60J 7/196 |
| | | | 296/216.01 |
| 2011/0266837 A1* | 11/2011 | Losch | B62D 25/04 |
| | | | 296/193.06 |
| 2012/0126584 A1* | 5/2012 | Jansen | B29C 45/1671 |
| | | | 156/60 |
| 2019/0366815 A1 | 12/2019 | Van Aken et al. | |

FOREIGN PATENT DOCUMENTS

| | | | | |
|---|---|---|---|---|
| EP | 1637439 A1 | 3/2006 | | |
| WO | WO-2010066213 A2 * | 6/2010 | | B60J 7/022 |
| WO | 2018134762 A1 | 7/2018 | | |

* cited by examiner

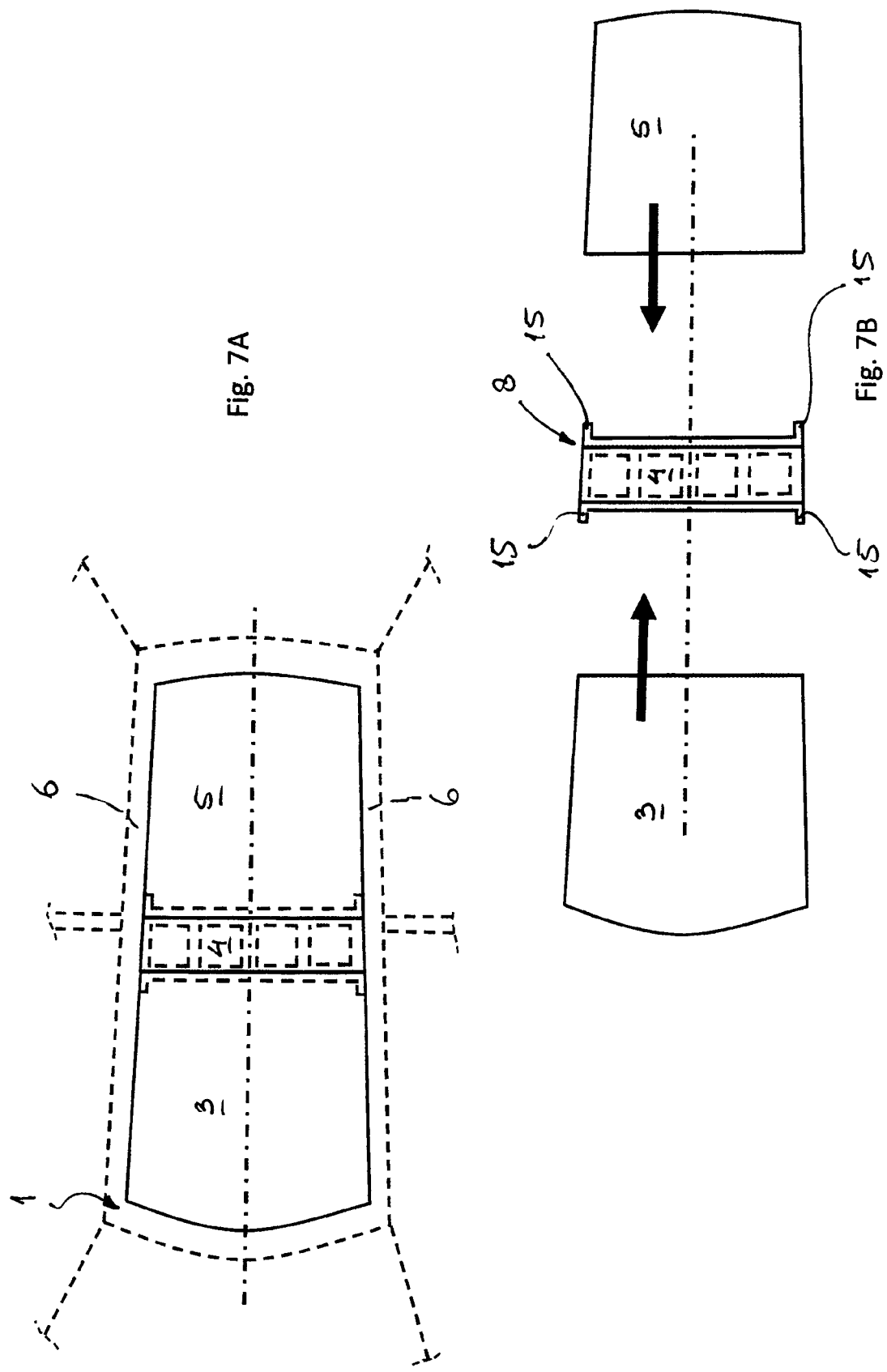

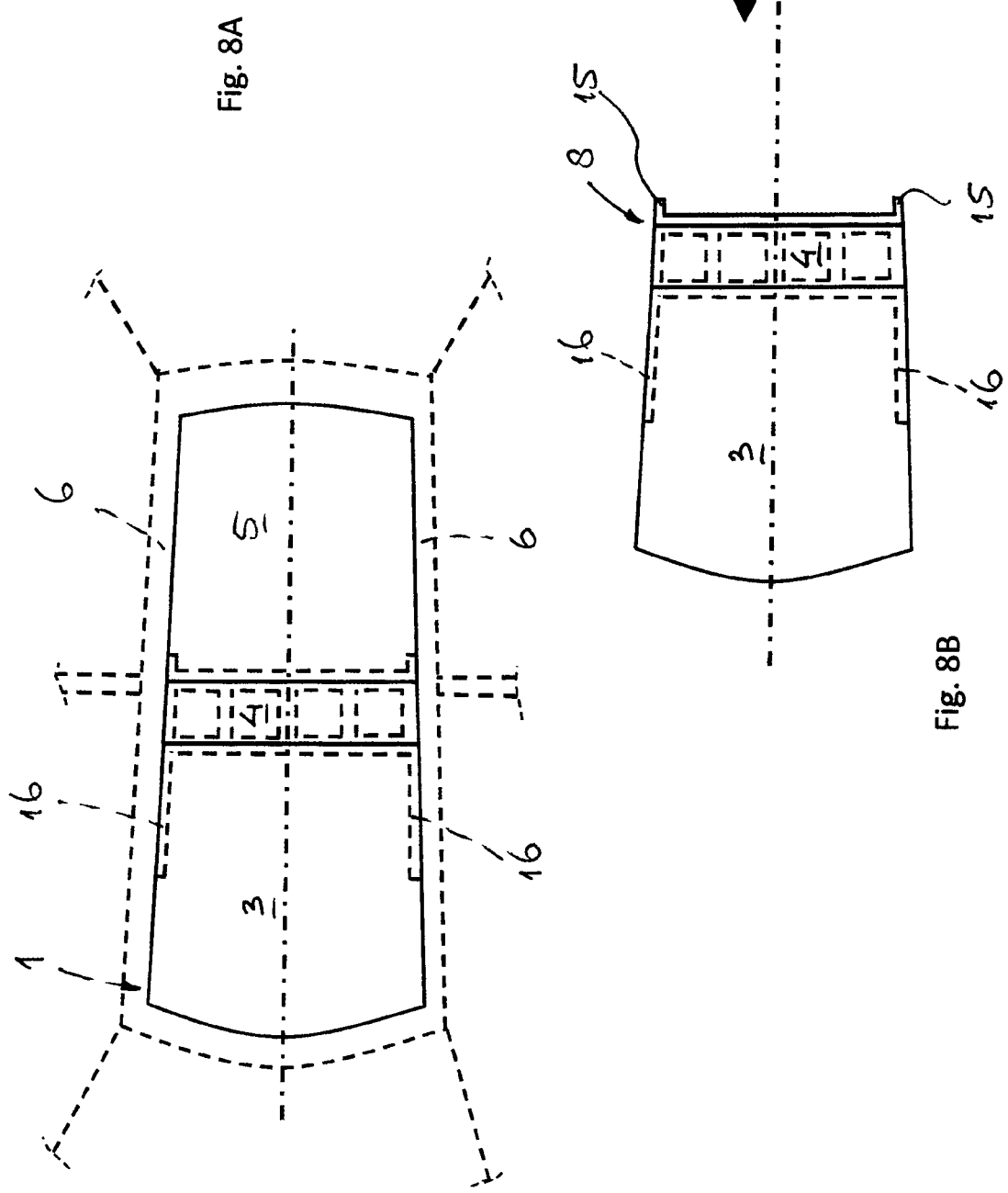

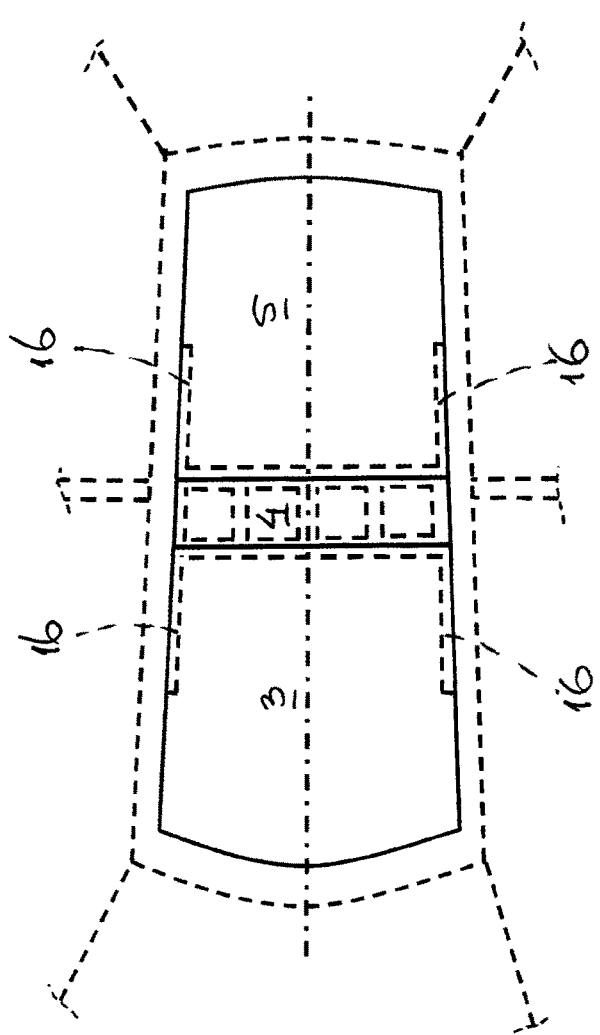
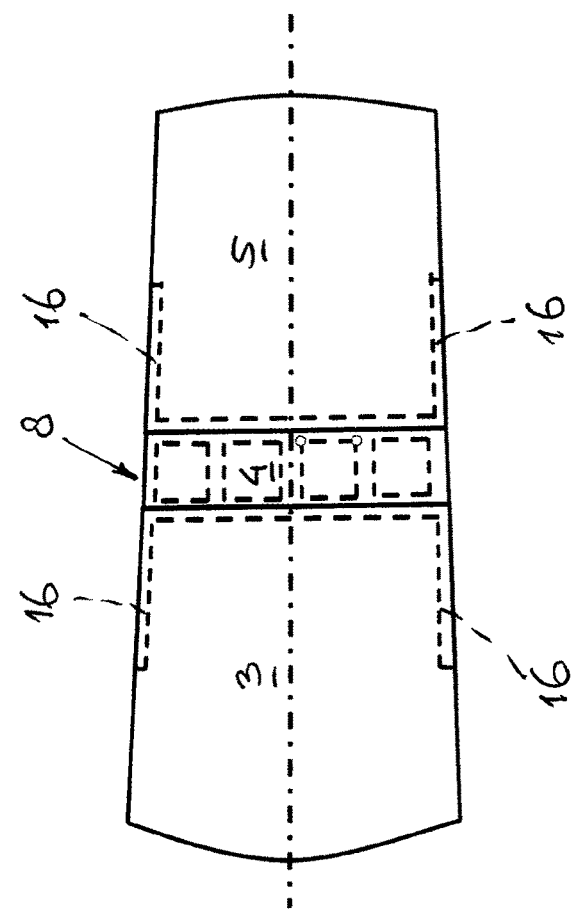
Fig. 9A
Fig. 9B

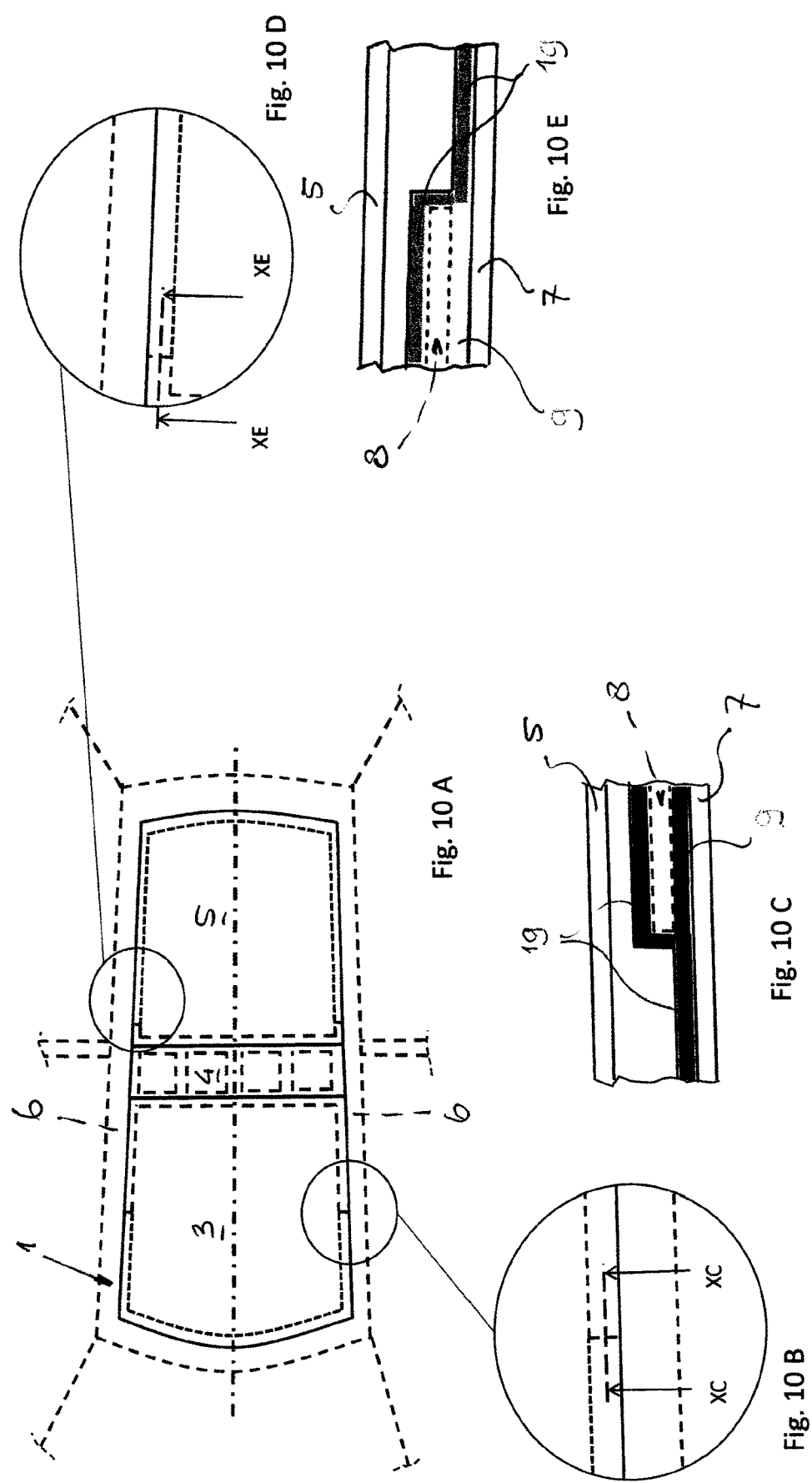

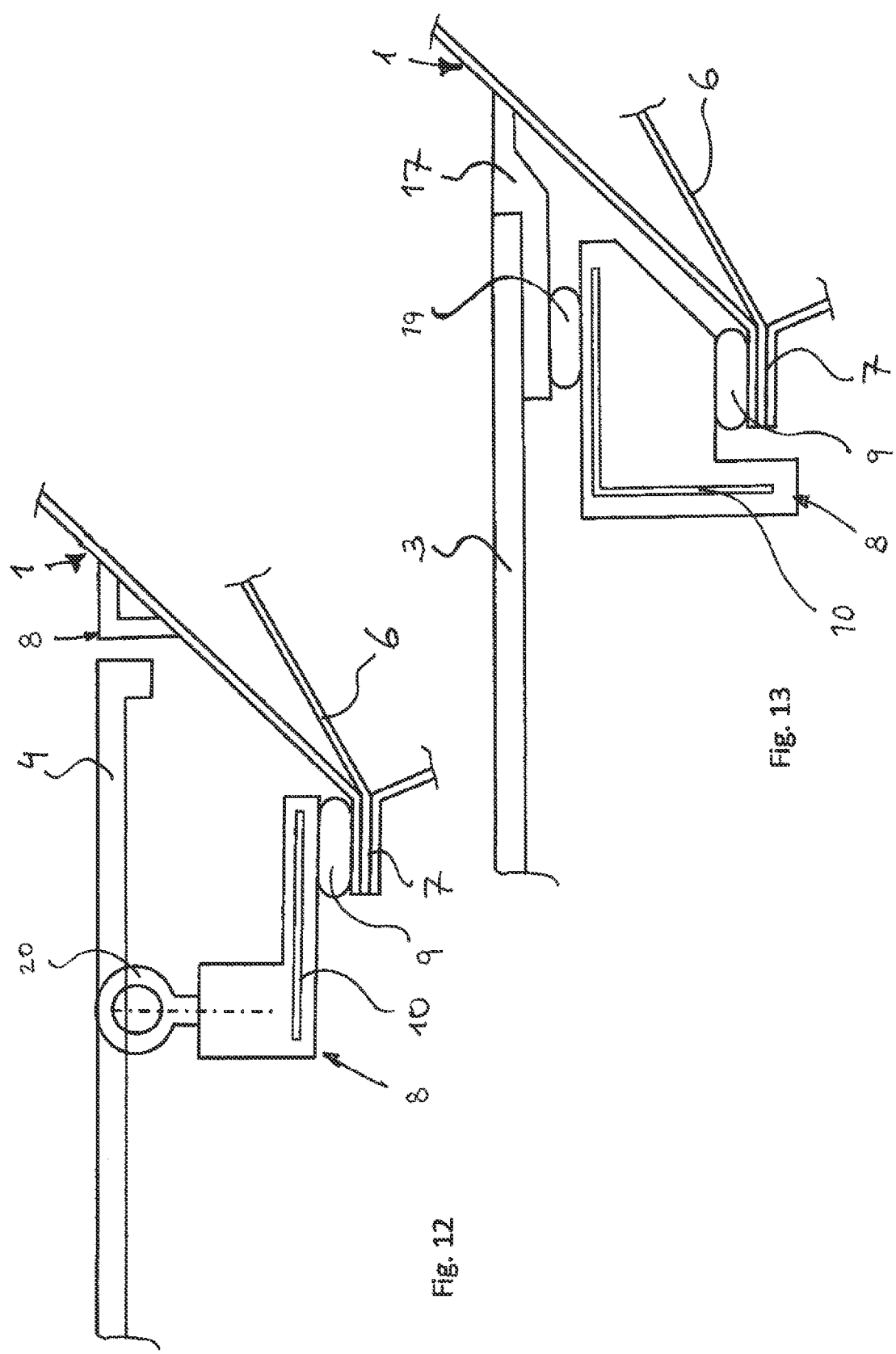

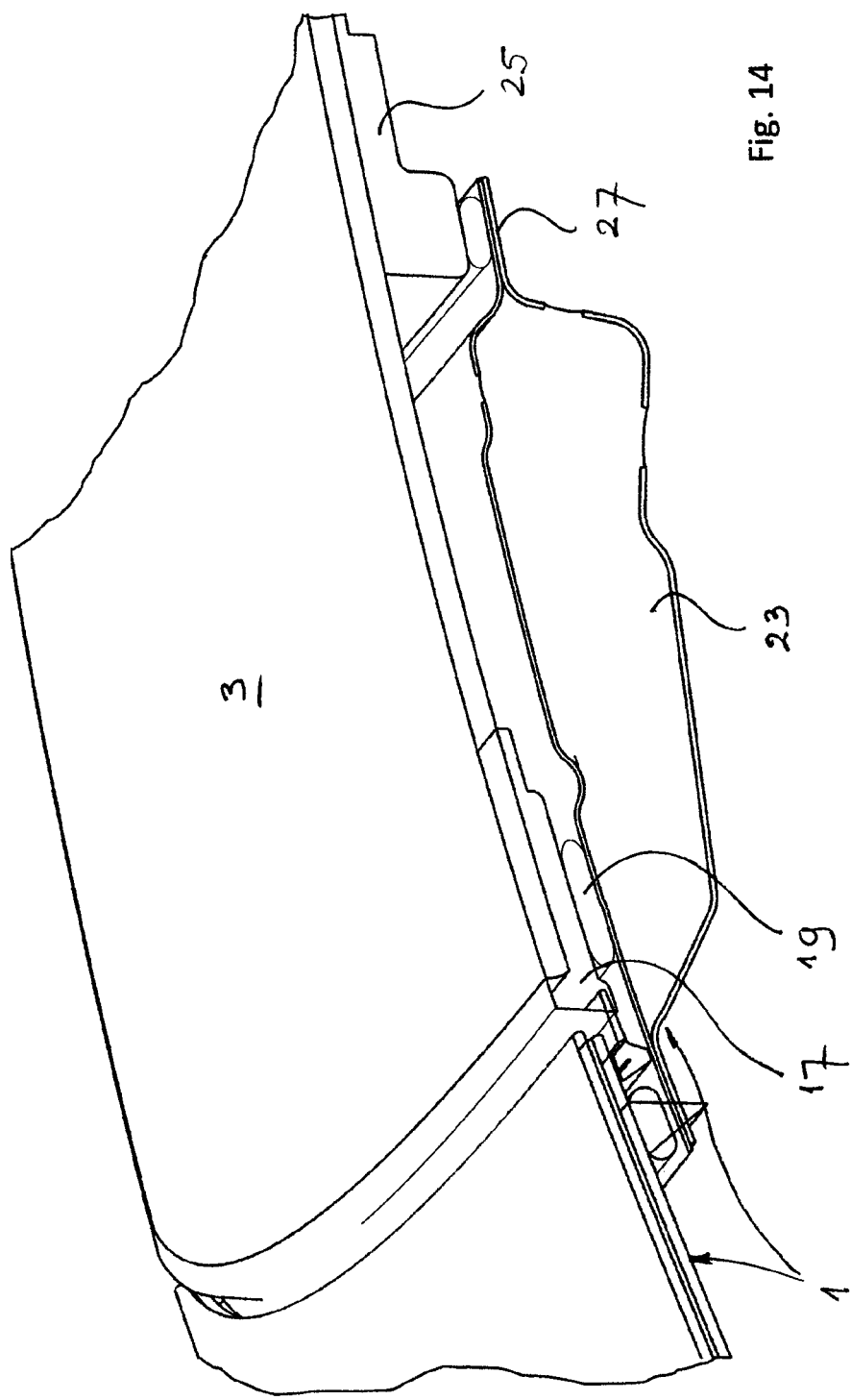

ROOF ASSEMBLY FOR A VEHICLE, AND VEHICLE COMPRISING SUCH ROOF ASSEMBLY

BACKGROUND

The discussion below is merely provided for general background information and is not intended to be used as an aid in determining the scope of the claimed subject matter.

Aspects of the invention relate to a roof assembly for attachment to reinforcement beams in a fixed roof of a vehicle, comprising: a frame surrounding at least a part of an opening and configured to be attached to at least the reinforcement beams of the vehicle, said frame being made primarily of plastic material, at least a first stationary panel which is at least partly semi-transparent and is at least partly fixed to the frame, at least one movable ventilation panel, arranged adjacent the stationary panel, and a reinforcement integrated in the frame.

OEMS (Original Equipment Manufactures) strive for a low aerodynamic drag coefficient for their electric driven passenger vehicles. A low drag coefficient is beneficial for the driving range which can be reached by one battery charge. Features that increase the drag coefficient such as open windows or open roof systems may negatively influence the range that can be reached by one battery charge. Nevertheless, a possibility for obtaining additional ventilation in the interior is often wished for by occupants. So instead of having an electric vehicle having no open roof construction or a fixed glass panel, the present invention relates to a roof system comprising a fixed glass panel having a ventilation panel which may, when opened, influence the drag coefficient of the vehicle less compared to a traditional open roof construction.

Although roof systems with a fixed or stationary panel and a movable panel, particularly a ventilation panel, are known in the art, see for example DE20103626U1 or DE102017003968B3, they are not provided with a plastic frame, which makes them relatively expensive.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A roof system includes a reinforcement that extends at least around an area covered by the movable panel, and along at least a portion of the frame configured to be attached to the reinforcement beams of the vehicle.

The reinforcement is arranged only in places where it is necessary. This will be around the movable panel. The fixed panel will provide stiffness due to its fixed attachment so that it is not necessary to provide a reinforcement all around it.

Preferably, the at least one movable panel is a ventilation panel which is movable at least between a closed position and a rearwardly and upwardly inclined venting position. However, the ventilation panel may also be movable in another direction, for instance such that the panel is opened by a movement in a vertical direction or that the panel opens at its front edge in an upwardly inclined venting position.

In one embodiment of the roof system, the ventilation panel is positioned behind the first stationary panel and preferably a second stationary panel is positioned behind the ventilation panel.

The ventilation position will then be positioned in an area above a generally present interior ceiling console which extends from on lateral side of the vehicle interior to an opposite lateral side, approximately from one B-pillar to the opposite one. The interior console may house parts such as a rollo winding shaft, sensors for the interior, lighting features, displays and transverse reinforcement beams. In this way also the console may be shaped to have ventilation holes such that interior air may travel from the interior via the vent holes in the interior console towards the exit formed by the open ventilation panel.

In a further embodiment, the frame is at least partly surrounding the first stationary panel and the ventilation panel and is formed in one piece, the second stationary panel being attachable partly to the frame and partly to the fixed roof of the vehicle.

In this manner, the roof system is only partially assembled during manufacture of the roof system, the second stationary panel will only be arranged in its position after the rest of the roof system is already positioned in the fixed roof of the vehicle. This is useful in cases where the size of the complete assembly of the first stationary panel, the ventilation panel and the second stationary panel is too large to handle, especially in between the moment of manufacturing at the supplier and of assembly in the body of the vehicle. It may then be better to split up this assembly in a front part and a rear part.

In such a case the vehicle manufacturer may decide to install the first stationary panel and the ventilation panel, which are joined in one piece, in the vehicle body in a first step and to assemble the second stationary panel in a second step.

In another embodiment, frame may surround the ventilation panel, and the first stationary panel is attachable partly to the frame and partly to the fixed roof of the vehicle.

This is the most minimalistic approach in which also the first stationary panel is not completely surrounded by the frame. Generally, the first stationary panel will be fixed to the frame during assembly of the roof system, but it is conceivable that also the first stationary panel is assembled when the frame is already in its position in the fixed roof.

If the reinforcement of the frame also extends in longitudinal direction along at least a portion of the first stationary panel, the panel can be more reliably fixed to the frame during assembly of the roof system.

The reinforcement may also extend in longitudinal direction along at least a portion of the first and second stationary panel, so that both stationary panels can be fixed to the frame during assembly of the roof system.

The reinforcement is preferably configured to be attached to the reinforcement beams in the vehicle roof extending in longitudinal direction. These reinforcement beams are always present in a fixed roof of a vehicle and are therefore the primary point of attachment for the reinforcement in the frame.

The reinforcement may also be configured to be attached to a transverse reinforcement beam in the vehicle roof extending in transverse direction.

If such reinforcement beam is not present in the fixed roof of the vehicle, the frame itself may be provided with a transverse reinforcement beam, which is then attached to the reinforcement beams of the vehicle roof extending in longitudinal direction.

The plastic frame may at least partly be made from polyurethane, which material is often used to encapsulate panels of vehicle roof systems.

A more rigid frame can be obtained if the frame is at least partly made from a plastic chosen from the group containing PBT+ASA (Polybutylene Terephthalate+Acrylonitrile), SMA (Styrene Maleic Anhydride), PP (Polypropylene) and PAG (glass Reinforced Polyamide).

In a further development at least one winding shaft for a windable sunscreen is positioned adjacent to the transverse reinforcement beam.

An aspect of the invention also includes a vehicle comprising a roof assembly attached to reinforcement beams in a fixed roof of the vehicle, said roof assembly comprising: a frame surrounding at least a part of an opening and attached to at least the reinforcement beams of the vehicle, said frame being made primarily of plastic material, at least a first stationary panel which is at least partly semi-transparent and is at least partly fixed to the frame, at least one movable panel, arranged adjacent to the stationary panel, and a reinforcement integrated in the frame.

According to an aspect of the invention, the reinforcement extends at least around an area covered by the movable panel, and along at least a portion of the frame that is attached to the reinforcement beams of the vehicle.

The frame may at least partly surround the first stationary panel and the ventilation panel and is formed in one piece, and wherein the second stationary panel is partly attached to the frame and partly to the fixed roof of the vehicle.

In another embodiment, the frame surrounds the ventilation panel, and the first stationary panel is partly attached to the frame and partly to the fixed roof of the vehicle, while also a second stationary panel may be partly attached to the frame and partly attached to the fixed roof of the vehicle.

BRIEF DESCRIPTION OF THE DRAWINGS

Further details and advantages of the roof assembly follow from the below description of the roof assembly with reference to the drawings showing some exemplary embodiments of the roof assembly.

FIG. 7A is a very schematic plan view of the fixed roof of the vehicle together with a second embodiment of the roof system and FIG. 7B is a schematic plan view of the roof system of FIG. 7A before it is installed into the vehicle.

FIG. 8A is a very schematic plan view of the fixed roof of the vehicle together with a third embodiment of the roof system and FIGS. 8B and 8C are schematic plan views of the roof system and panel of FIG. 8A before it is installed into the vehicle.

FIG. 9A is a very schematic plan view of the fixed roof of the vehicle together with a fourth embodiment of the roof system and FIG. 9B is a schematic plan view of the roof system of FIG. 9A before it is installed into the vehicle.

FIG. 10A is a view corresponding to that of FIG. 8A, but also showing the glue beads, with which the panels are glued to the fixed roof of the vehicle.

FIGS. 10B and 10D are enlarged views of details B and D in FIG. 10A.

FIGS. 10C and 10E are enlarged cross sections along the line XC-XC in FIG. 10B and along line XE-XE in FIG. 10D.

FIGS. 11, 12 and 13 are cross-sections taken at positions similar to those of FIGS. 3-5, but through the embodiments of FIGS. 8A-8C or 9A-9B.

FIGS. 14 and 15 are enlarged sectional perspective views along the lines XIV-XIV and XV-XV, respectively, in FIG. 2.

DETAILED DESCRIPTION

Figure 1:
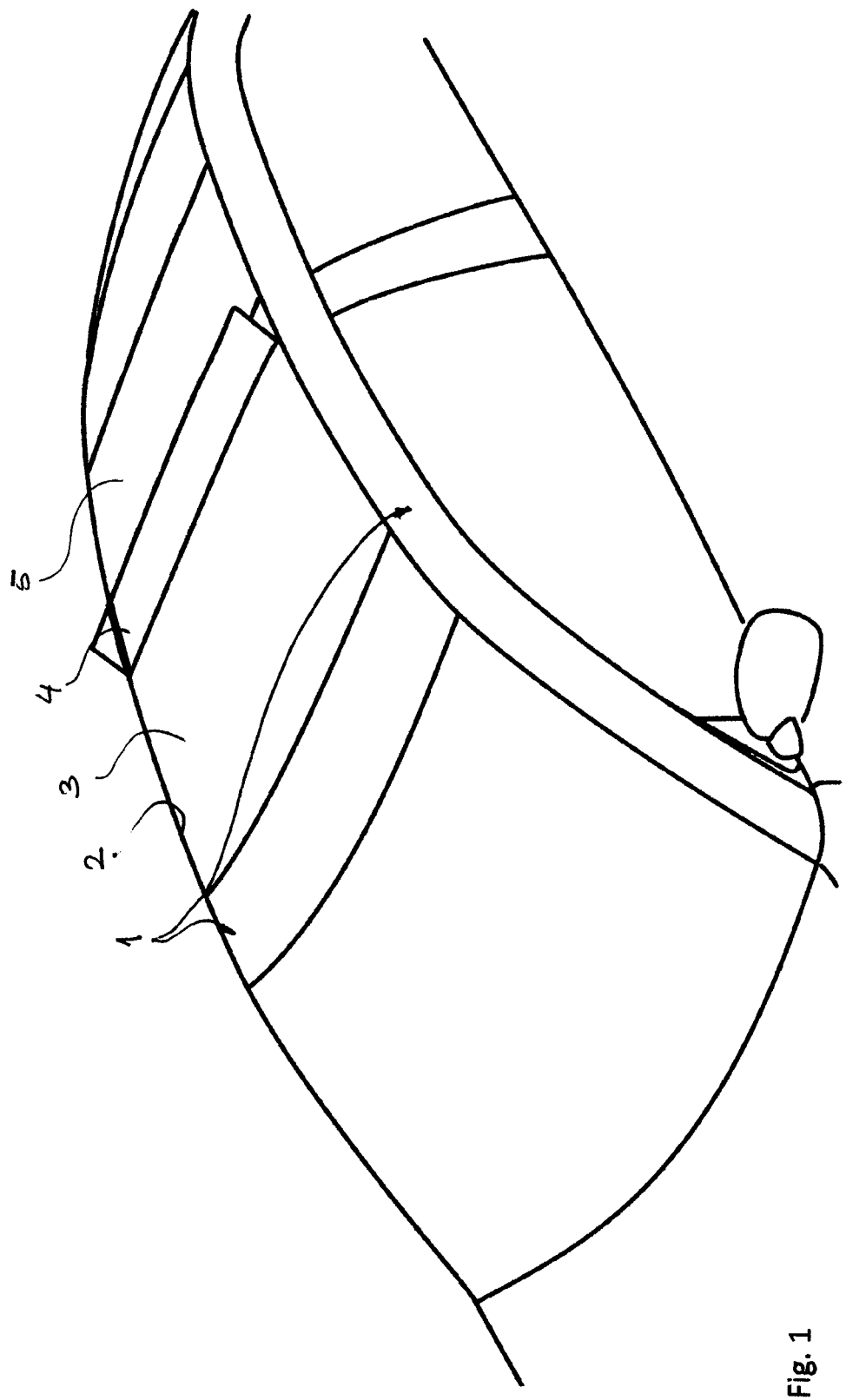
FIG. 1 is a schematic perspective view of a vehicle roof comprising a roof system, illustrating a central panel in its open position.
Figure 2:
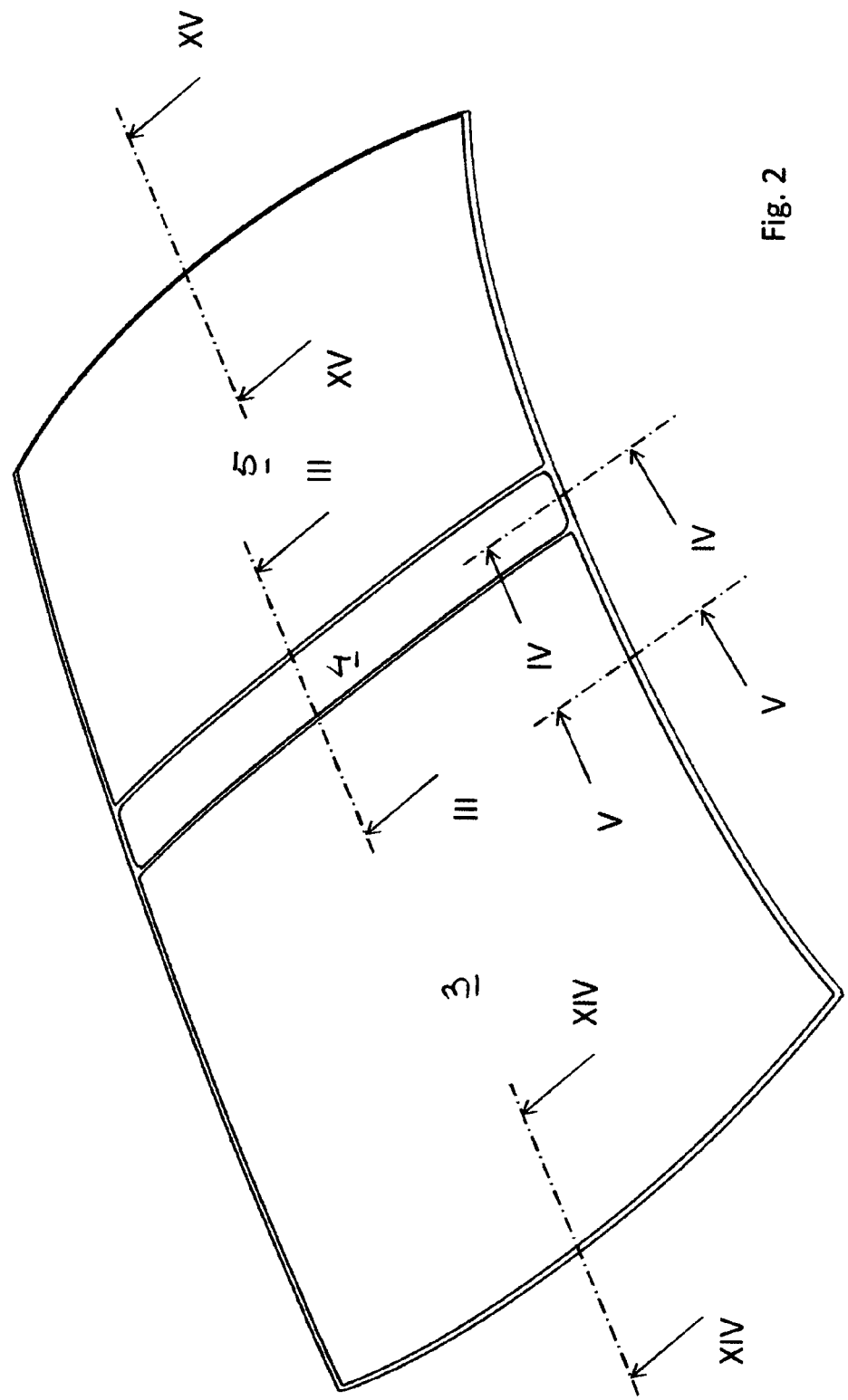
FIG. 2 is an enlarged perspective view of the roof system of FIG. 1 separate from the vehicle.

FIG. 1 shows the upper part of a vehicle, particularly a passenger car. The vehicle may however also be an SUV, a truck, a camper, caravan, or the like. The vehicle has a fixed roof 1, in this case comprising a very large opening 2, in which the roof system is arranged. In the embodiment shown in FIGS. 1 and 2, the roof system includes an at least semi-transparent first or front stationary panel 3, a movable, central ventilation panel 4 and a second or rear stationary panel 5. The roof system could, however, also comprise one stationary panel only, either the front or the rear, although the front panel 3 would be favoured. The panels 3-5 are made of glass or of plastic and be made permanently semi-transparent or be provided with a (known) system to vary the transparency of one or more of the panels, for example electronically.

The central ventilation panel 4 is in this case quite narrow or short in longitudinal (X) direction, but dimensions could be varied. It would also be possible that there are two separate ventilation panels arranged side-by-side in transverse (Y) direction. In the embodiment shown, the ventilation panel 4 is movable between a closed position substantially flush with stationary panels 3 and 5 and an open position, in which the rear side of ventilation panel 4 is moved upwardly to a rearwardly and upwardly inclined position. Other movements are conceivable as well.

Figure 3:
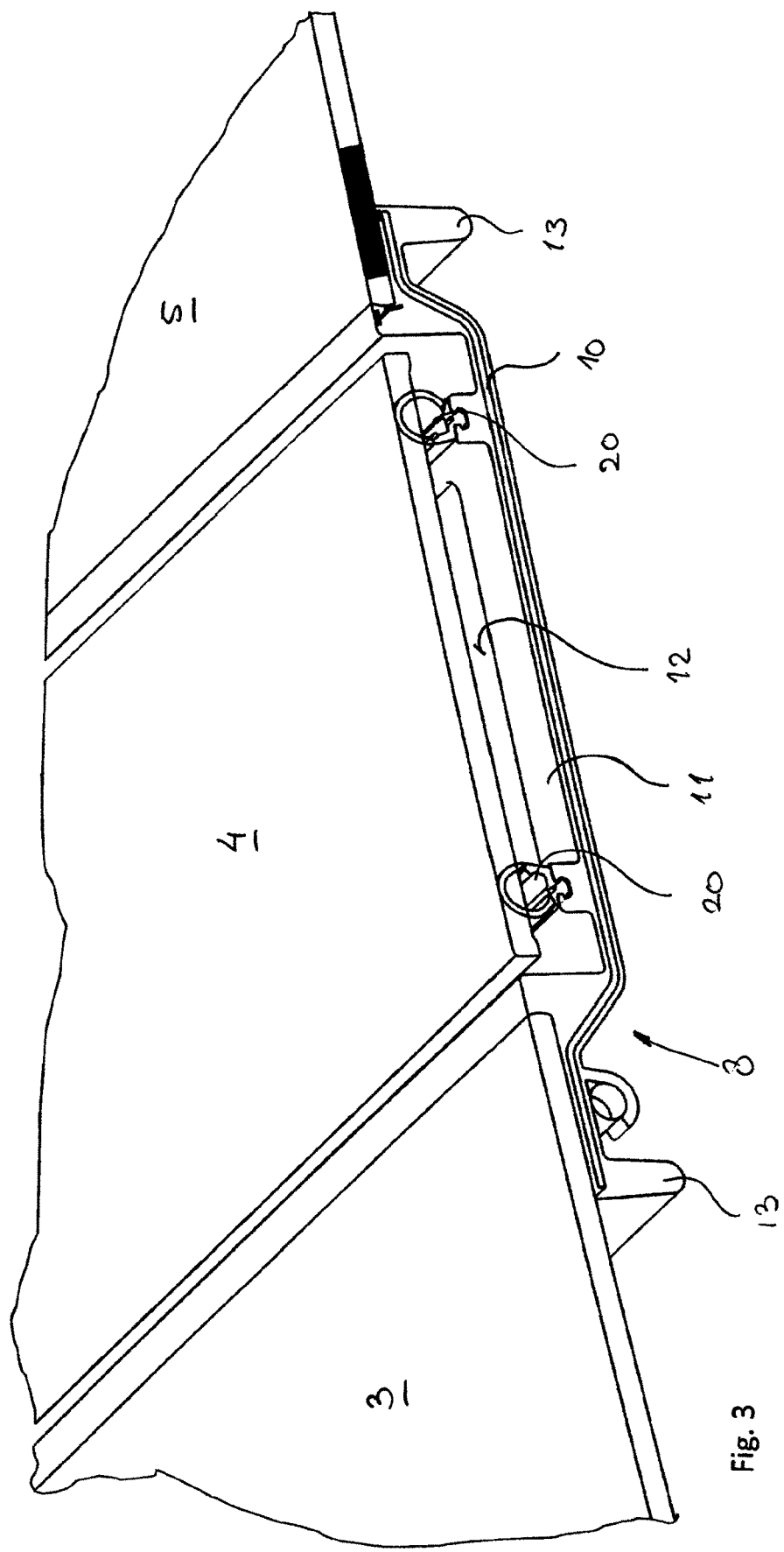
FIGS. 3, 4 and 5 are enlarged sectional perspective views along the lines III-III, IV-IV and V-V, respectively, in FIG. 2.
Figure 4:
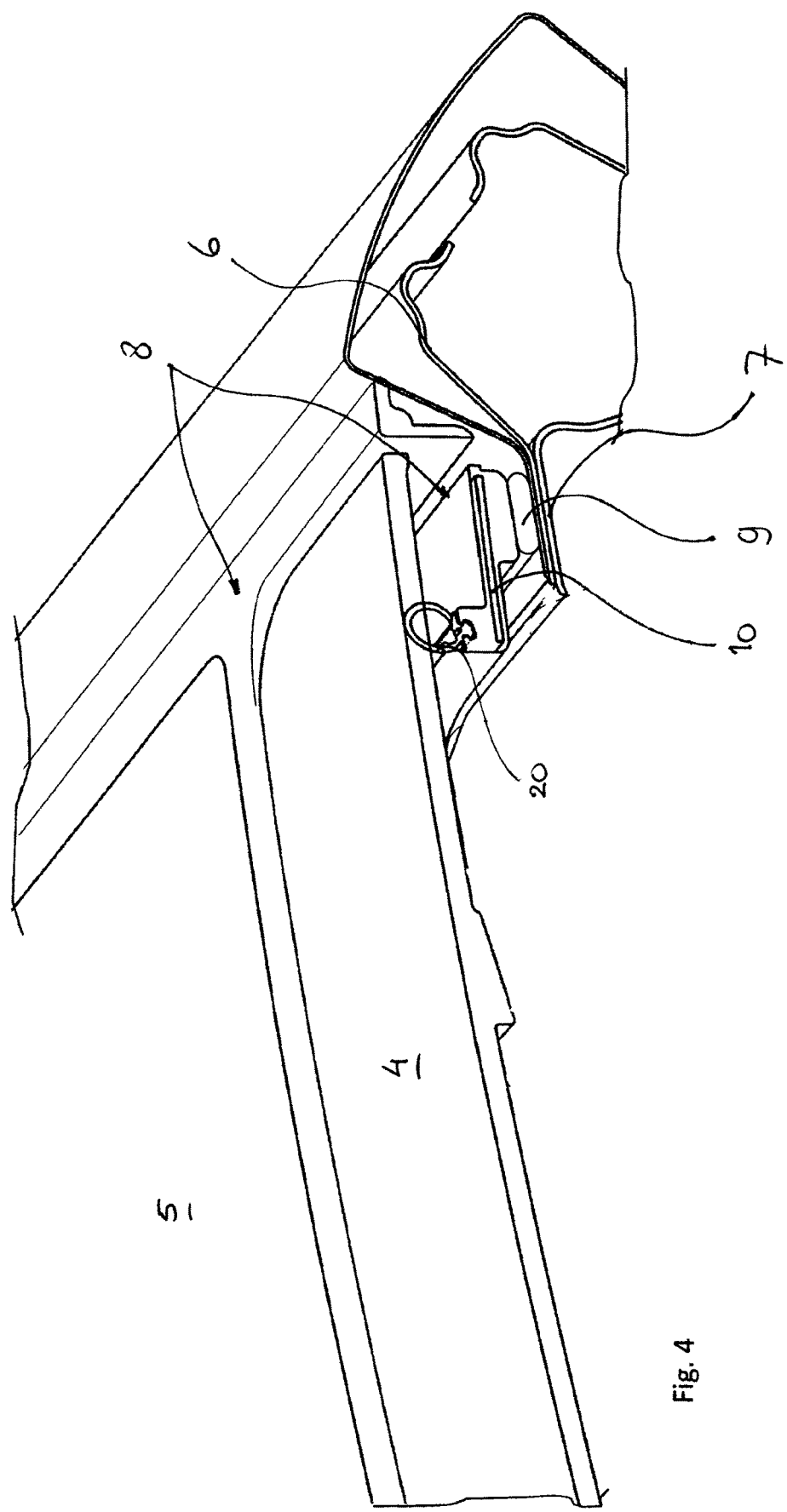
Figure 5:
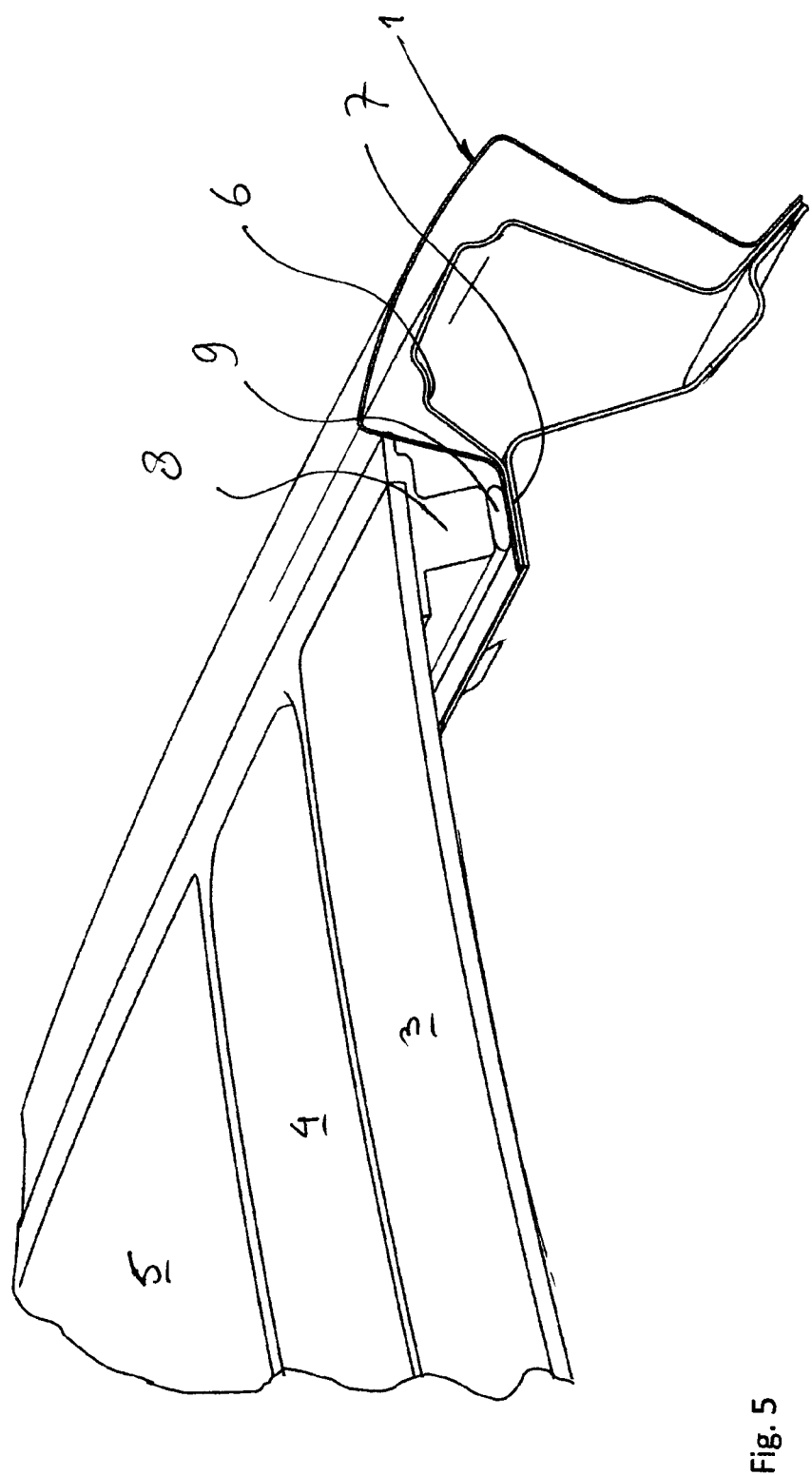

FIGS. 3, 4 and 5 show how the roof system is fixed to longitudinal reinforcement beams 6 of fixed roof 1 of the vehicle. These longitudinal reinforcement beams 6 are also called cantrails. They comprise a horizontal flange 7 onto which a frame 8 of the roof system can rest. Frame 8 is made primarily from plastic, here Polyurethane (PU) but PBT+ ASA, SMA, PP and PAG are also available as frame material. A glue bead 9 can be used to attached frame 8 to fixed roof 1.

Especially FIGS. 3 and 4 show that frame 8 comprises a reinforcement 10, preferably made of metal, particularly steel. It extends at least along and below the circumference of ventilation panel 4 and includes a plurality of cross bars 11 leaving a plurality of ventilation openings 12. The reinforcement 10 also extends such that it overlaps flanges 7 of reinforcement beams 6 of fixed roof 1, so that it can be attached thereto, either directly, for example by (spot) welding, or indirectly by means of glue and/or bolts. As is shown in FIG. 4, reinforcement 10 may be covered by the plastic of frame 8 at the position of flanges 7.

FIGS. 3 and 4 show that frame 8 may carry a seal 20 below the whole circumference of movable panel 4. Downwardly extending ribs 13 may be provided at the transverse sides of reinforcement 10. The ventilation panel 4 is preferably adjusted by an electric motor through an operating mechanism (not shown), positioned either in the middle or on one or both transverse ends of panel 4. Panel 4 may also be split inti two panels arranged side-by-side and each having its own operating mechanism.

Figures 6A, 6B:
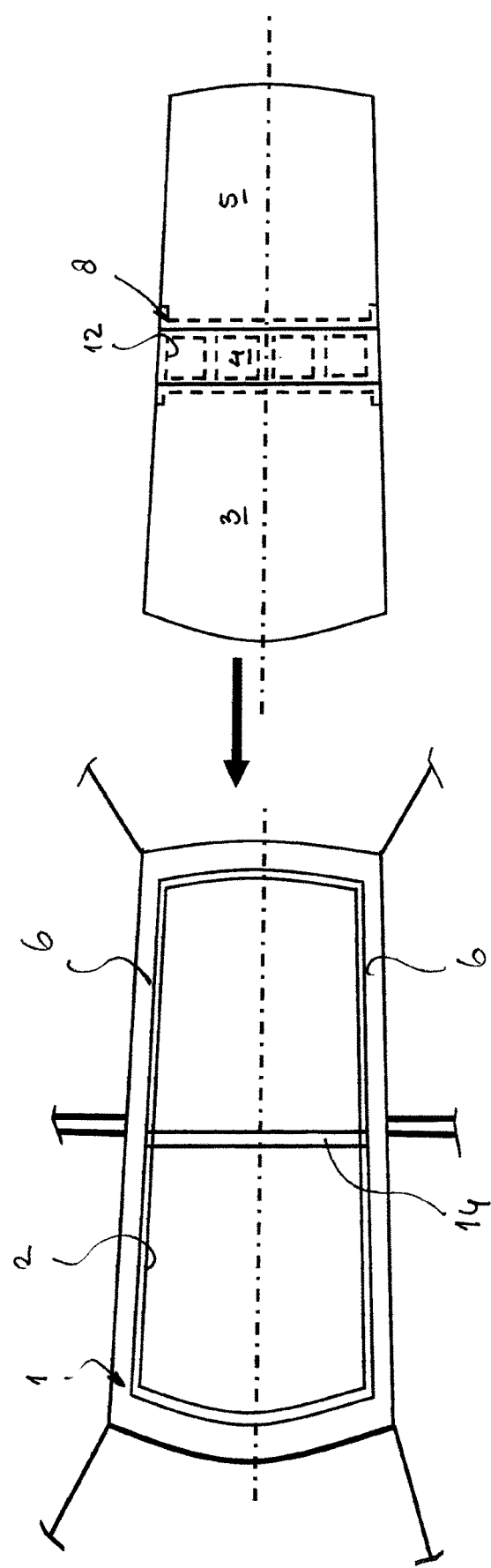
FIG. 6A is a very schematic plan of the fixed roof of the vehicle and FIG. 6B is a plan view of a first embodiment of the roof system to be attached to the fixed roof.

FIG. 5 shows that plastic frame 8 is also glued by glue bead 9 to flange 7 at the position where no reinforcement is present. Here, plastic frame 8 extends around the whole circumference of panels 3 and 5. In this embodiment, the panels 3 and 5 and frame 8 are first assembled into a unit and during manufacture of the vehicle the unit is built into the vehicle, as illustrated in FIGS. 6A and 6B. It is also shown there that the vehicle may also be provided with a transverse reinforcement beam 14. This will be further discussed with reference to other embodiments.

FIGS. 7A and 7B shows an embodiment in which frame 8 is only present around movable panel 4 and is provided with short longitudinal protrusions 15 only along their longitudinal sides. This small unit will be built into the vehicle first and only then panels 3 and 5 are glued to the front and rear of frame 8 and on the other sides directly to the longitudinal reinforcement beams 6 of fixed roof 1 and to transverse beams.

FIGS. 8A-8C illustrate an embodiment in which frame 8 is provided with two short longitudinal protrusions 15 at the rear only. Long longitudinal protrusions 16 are arranged at the front of frame 8, such that front panel 3 can be glued to frame 8 to form a unit, then built into the vehicle and only then rear panel 5 is glued to frame 8 and directly to the vehicle. As frame 8 in this embodiment also does not extend around the whole circumference of front panel 3, this panel will also be partly glued directly to the vehicle.

In the embodiment of FIGS. 9A-9B, frame 8 has long protrusions 16 in both rearward and forward direction, so that both panels 3 and 5 can be united with frame 8 before the unit is built into the vehicle. Generally, reinforcement 10 will extend into either short protrusions 15 or long protrusions 16.

FIG. 10A—10E again show the embodiment of FIGS. 8A-8C as built into the vehicle. FIGS. 10C and 10E show the joint where frame 8 ends and panels 3, 5 are attached directly to flange 7 of fixed roof 1. In FIG. 10C on the right an encapsulation 17 of panel 3 is attached to frame 8 by a glue bead 19. This is already done in the factory of the manufacturer of the roof system. It is further shown in FIG. 10C that frame 8 and encapsulation 17 of panel 3 are attached to flange 7 by glue bead 9. This is done at the manufacturer of the vehicle. To enable this, encapsulation 17 includes a step 18, so that the lower side of frame 8 and the lower side of encapsulation 17 adjacent frame 8 are substantially flush, and together they are attached to flange 7 by glue bead 9. The same configuration is shown in FIG. 10E for rear panel 5.

Figure 11:
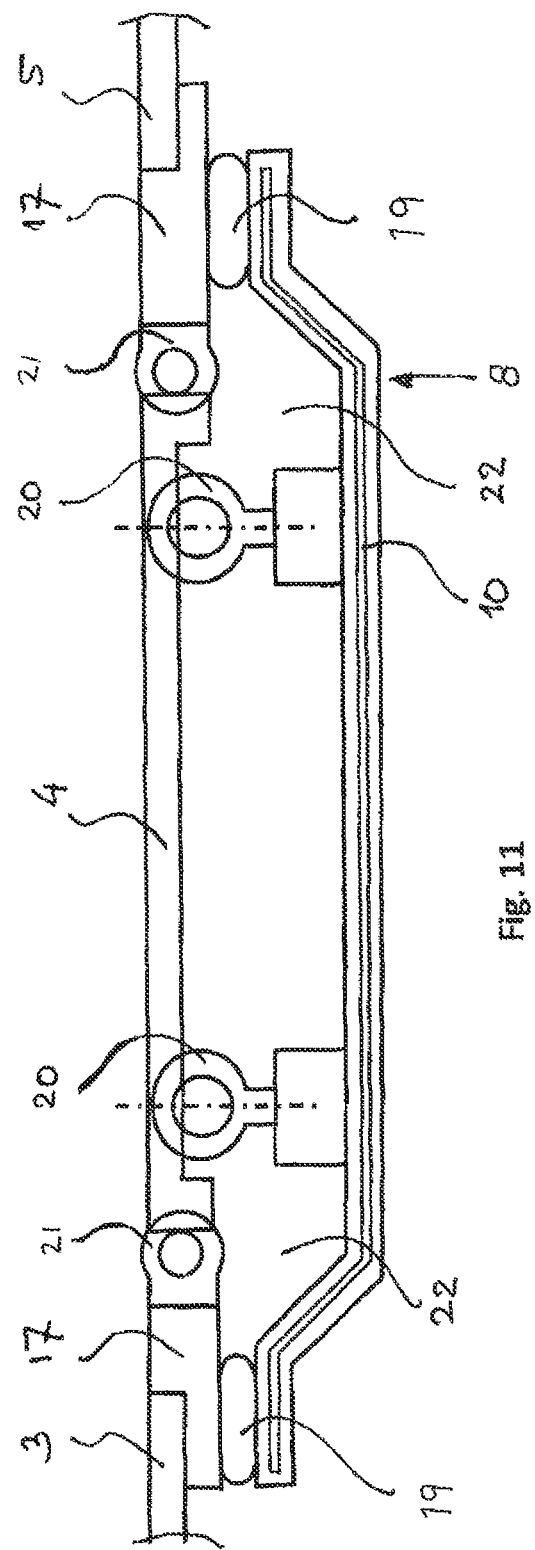

FIGS. 11, 12 and 13 are cross sections of the embodiment of FIGS. 8A-8C or 9A-9B at the positions of those of FIGS. 3-5. It is shown that in FIG. 11 that encapsulation 17 of panels 3 and 5 carry a seal 21 to seal ventilation panel 4 in its closed position. There is a wet area 22 below seals 21 to catch any water seeping through. In FIG. 12, frame 8 is attached to flange 7, whereas in FIG. 13 encapsulation 17 of panel 3 is attached to frame 8 by glue bead 19, while frame 8 is attached to flange 7 of fixed roof 1 by glue bead 9.

Figure 15:
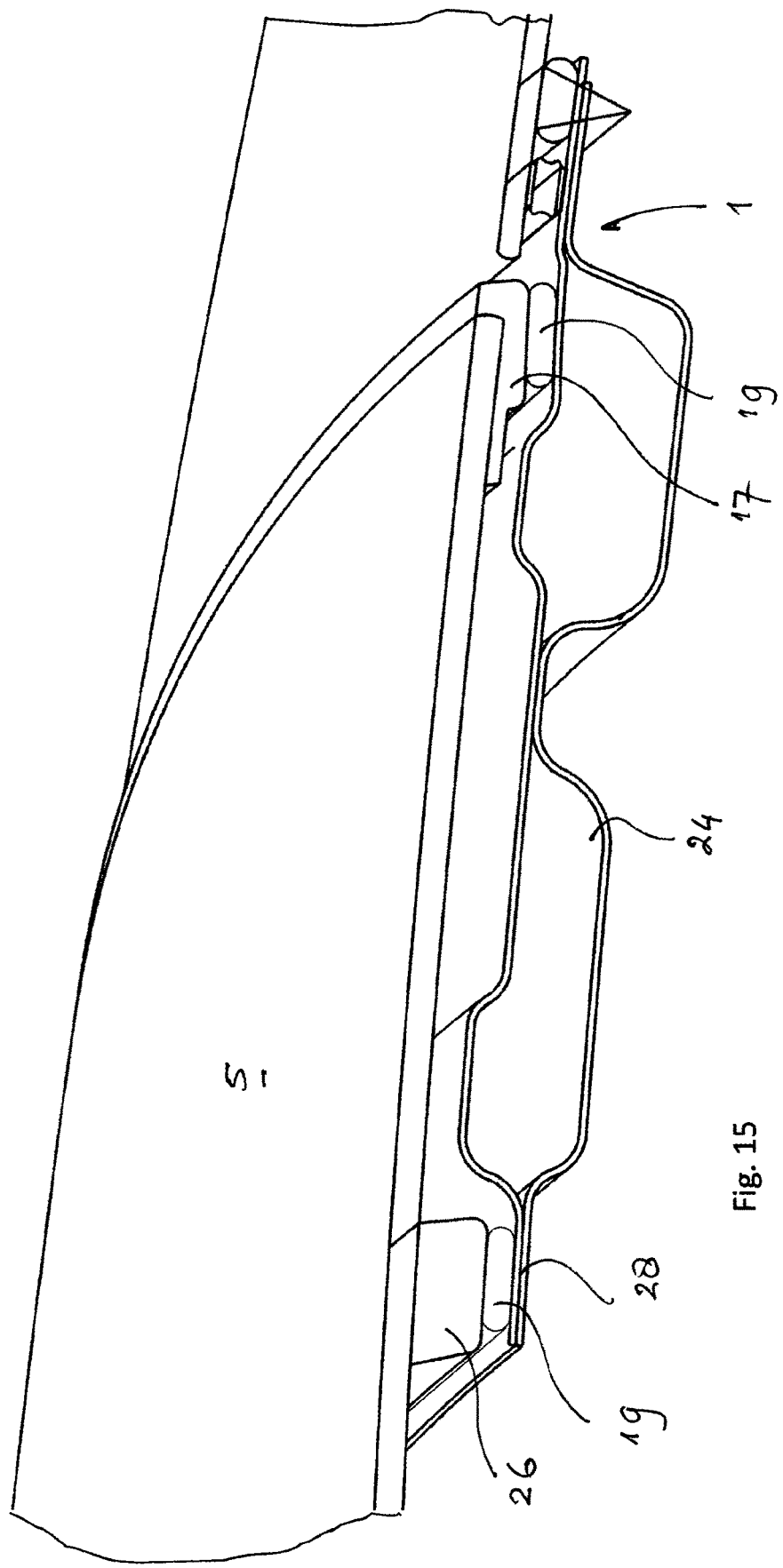

FIGS. 14 and 15 show how panels 3 and 5 are attached to fixed roof 1 at their front at rear sides. Both figures show that panels 3 and 5 are not only attached with their perimeter encapsulation 17 to transverse beams 23, 24, respectively, but also with an additional transverse encapsulation 25, 26 spaced from encapsulation 17 and attached to a horizontal flange 27, 28 at the free edge of transverse beam 23, 24.

Figure 16:
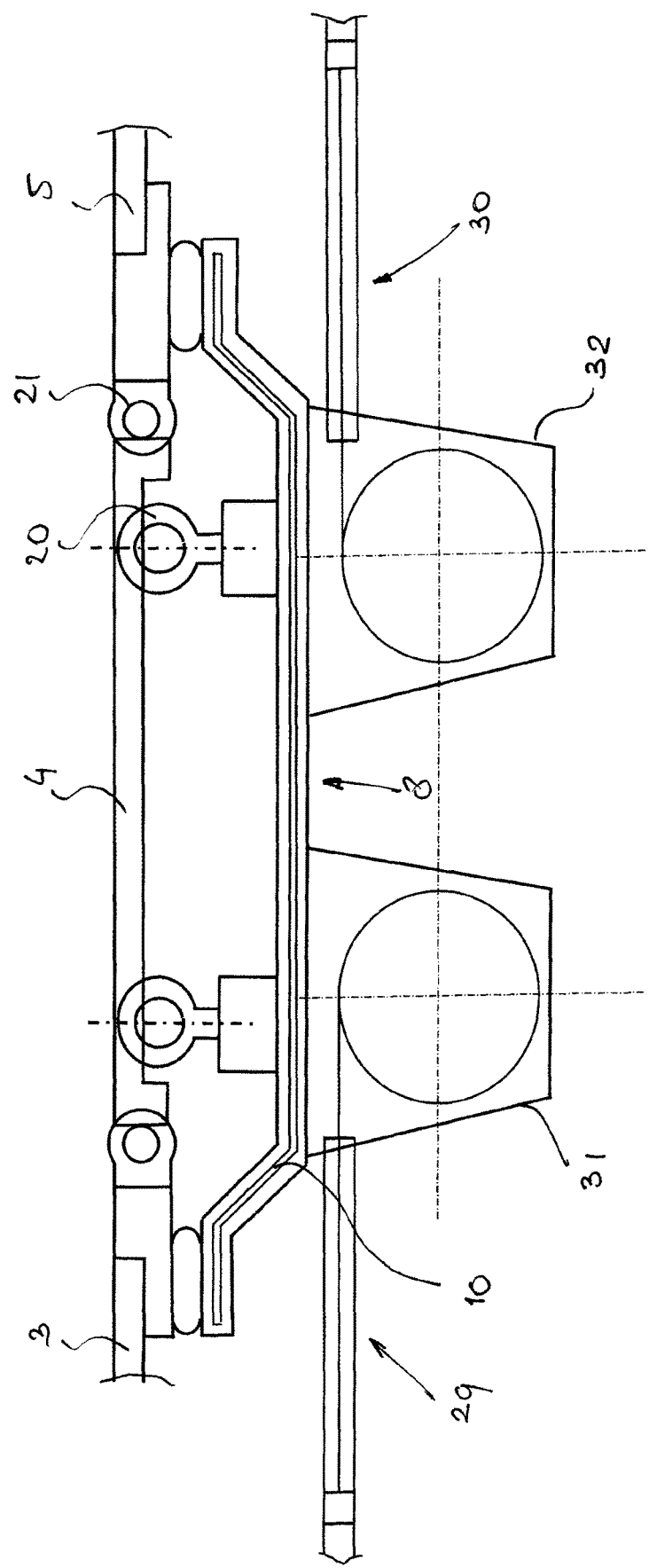
FIG. 16 is a cross sectional view corresponding to that of FIG. 11, but of another embodiment.

FIG. 16 is a cross section through another embodiment in which sunshades 29, 30 are provided, of which a winding roller housing 31, 32 for a winding shaft is arranged below the front and rear edge of ventilation panel 4. In this way the rollo sunshades can be moved to a closed position below the respective panel 3, 5 to prevent light coming through semi-transparent panels 3, 5 from entering the vehicle's interior.

Figures 17A, 17B:
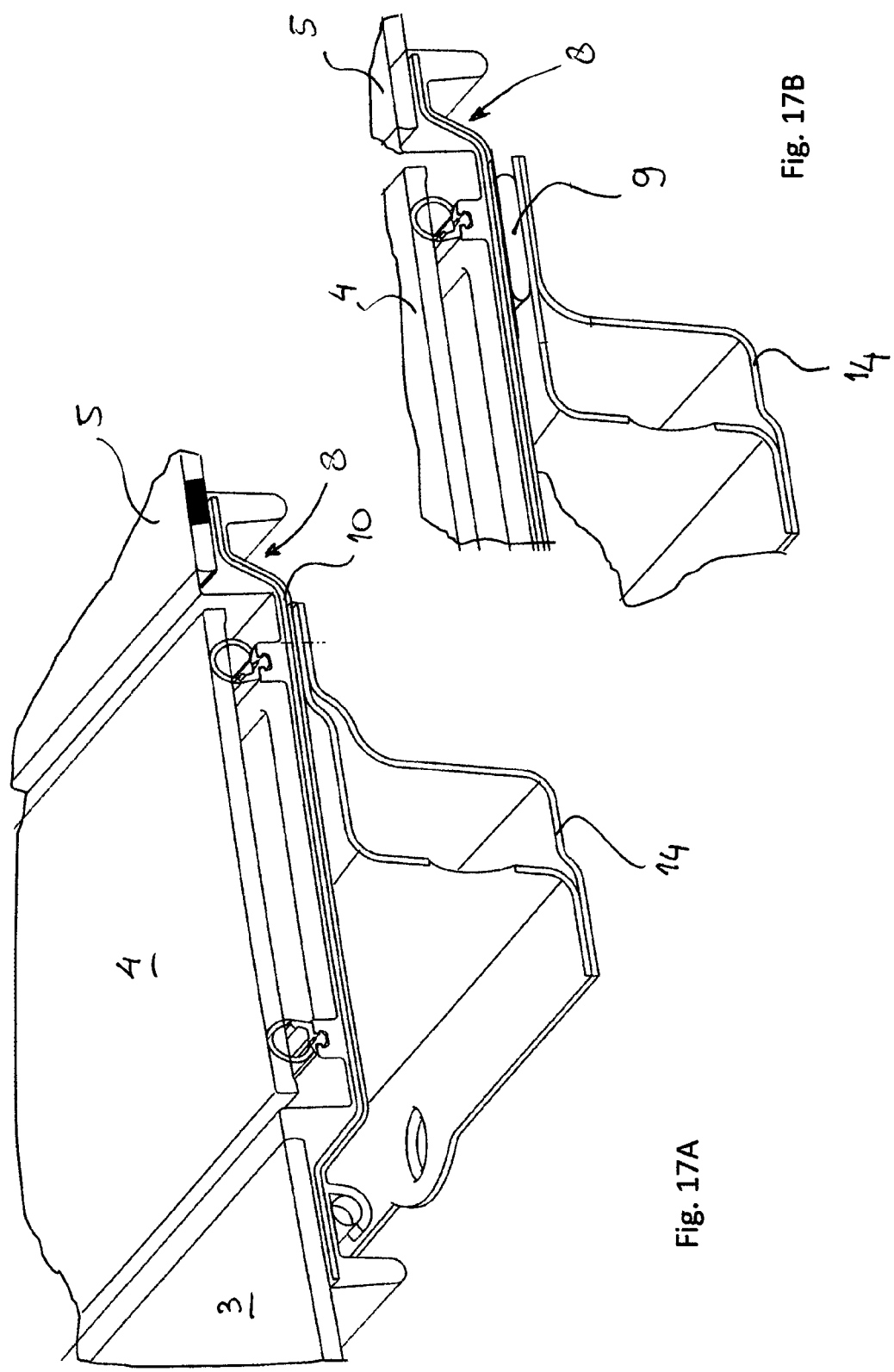
FIG. 17A is a cross-sectional view corresponding to that of FIG. 3, but of another embodiment.
FIG. 17B is a part of a view corresponding to that of FIG. 17A but showing another embodiment.

FIGS. 17A and 17B show further variations of the roof system having transverse reinforcement beam 14 as already shown in FIG. 6A. In FIG. 17A, transverse reinforcement beam 14 is part of the roof system and is welded or bolted to reinforcement 10 of frame 8. This transverse reinforcement beam 14 will be glued to longitudinal reinforcement beam 6 of fixed roof 1. In FIG. 17B, transverse reinforcement beam 14 is part of the vehicle and therefore welded or bolted to longitudinal reinforcement beams 6. Frame 8 is glued to transverse beam 14 then.

From the foregoing it will be clear that aspects of the invention provide a versatile roof system having low cost and profile, but still allowing ventilation.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims and embodiments are herewith disclosed.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e. open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. A roof assembly for attachment to reinforcement beams in a fixed roof of a vehicle, comprising:
    a frame surrounding at least a part of an opening and configured to be attached to the reinforcement beams of the vehicle, said frame being made primarily of plastic material;
    a first stationary panel which is at least partly semi-transparent and is at least partly fixed to the frame;

at least one ventilation panel, arranged behind the first stationary panel and movable at least between a closed positon and a rearwardly and upwardly inclined venting position;

a second stationary panel positioned behind the ventilation panel;

a reinforcement integrated in the frame, wherein the reinforcement extends at least around an area covered by the ventilation panel, and along at least a portion of the frame configured to be attached to the reinforcement beams of the vehicles; and wherein the frame is at least partly surrounding the first stationary panel and the ventilation panel and is formed in one piece, the second stationary panel being attachable partly to the frame and partly to the fixed roof of the vehicle.

2. A roof assembly for attachment to reinforcement beams in a fixed roof of a vehicle, comprising:

a frame surrounding at least a part of an opening and configured to be attached to the reinforcement beams of the vehicle, said frame being made primarily of plastic material;

a first stationary panel which is at least partly semi-transparent and is at least partly fixed to the frame;

at least one ventilation panel, arranged behind the first stationary panel; and a reinforcement integrated in the frame, wherein the reinforcement extends at least around an area covered by the ventilation panel, and along at least a portion of the frame configured to be attached to the reinforcement beams of the vehicle; and wherein the frame surrounds the ventilation panel and the first stationary panel is attachable partly to the frame and partly to the fixed roof of the vehicle.

3. The roof assembly according to claim 1, wherein the reinforcement also extends in longitudinal direction along at least a portion of the first stationary panel.

4. The roof assembly according to claim 1, wherein the reinforcement also extends in longitudinal direction along at least a portion of the first and second stationary panel.

5. The roof assembly according to claim 1, wherein the reinforcement is configured to be attached to the reinforcement beams in the fixed roof extending in longitudinal direction.

6. The roof assembly according to claim 1, wherein the reinforcement is configured to be attached to a transverse reinforcement beam in the fixed roof extending in transverse direction.

7. The roof assembly according to claim 1, wherein the frame includes a transverse reinforcement beam attached to the reinforcement beams of the fixed roof extending in longitudinal direction.

8. The roof assembly according to claim 1, wherein the frame is at least partly made from polyurethane.

9. The roof assembly according to claim 1, wherein the frame is at least partly made from a plastic chosen from the group containing Polybutylene Terephthalate+Acrylonitrile, Styrene Maleic Anhydride, Polypropylene, and glass Reinforced Polyamide.

10. The roof assembly according to claim 6, wherein at least one winding shaft for a windable sunscreen is positioned adjacent to the transverse reinforcement beam.

11. A vehicle comprising a roof assembly attached to reinforcement beams in a fixed roof of the vehicle, said roof assembly comprising:

a frame surrounding at least a part of an opening and attached to at least the reinforcement beams of the vehicle, said frame being made primarily of plastic material;

a first stationary panel which is at least partly semi-transparent and is at least partly fixed to the frame;

a second stationary panel which is partly attached to the frame and partly to the fixed roof of the vehicle;

at least one ventilation panel, arranged adjacent to the first stationary panel; and a reinforcement integrated in the frame, wherein the reinforcement extends at least around an area covered by the ventilation panel, and along at least a portion of the frame that is attached to the reinforcement beams of the vehicle, and wherein the frame is at least partly surrounding the first stationary panel and the ventilation panel and is formed in one piece.

12. The vehicle according to claim 11, wherein the frame surrounds the ventilation panel and the first stationary panel is partly attached to the frame and partly to the fixed roof of the vehicle.

13. The vehicle according to claim 11, wherein the at least one ventilation panel which is movable at least between a closed position and a rearwardly and upwardly inclined venting position.

14. The vehicle according to claim 13, wherein the at least one ventilation panel is positioned behind the first stationary panel.

15. The roof assembly according to claim 2, wherein the reinforcement also extends in longitudinal direction along at least a portion of the first stationary panel.

16. The roof assembly according to claim 2, wherein the reinforcement is configured to be attached to the reinforcement beams in the fixed roof extending in longitudinal direction.

17. The roof assembly according to claim 2, wherein the reinforcement is configured to be attached to a transverse reinforcement beam in the fixed roof extending in transverse direction.

18. The roof assembly according to claim 2, wherein the frame includes a transverse reinforcement beam attached to the reinforcement beams of the fixed roof extending in longitudinal direction.

19. The roof assembly according to claim 17, wherein at least one winding shaft for a windable sunscreen is positioned adjacent to the transverse reinforcement beam.

* * * * *